United States Patent
Iwasaki et al.

(10) Patent No.: US 10,717,397 B2
(45) Date of Patent: Jul. 21, 2020

(54) INTERIOR PART AND METHOD FOR MANUFACTURING THE SAME

(71) Applicant: TOYOTA BOSHOKU KABUSHIKI KAISHA, Aichi-ken (JP)

(72) Inventors: Hironobu Iwasaki, Aichi-ken (JP); Tamotsu Nagaya, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 165 days.

(21) Appl. No.: 15/704,847

(22) Filed: Sep. 14, 2017

(65) Prior Publication Data
US 2018/0079372 A1   Mar. 22, 2018

(30) Foreign Application Priority Data
Sep. 20, 2016   (JP) ................. 2016-182963

(51) Int. Cl.
  *B32B 7/08*   (2019.01)
  *B60R 13/02*   (2006.01)
  *D05B 23/00*   (2006.01)
  *B32B 3/26*   (2006.01)

(52) U.S. Cl.
  CPC .............. *B60R 13/02* (2013.01); *D05B 23/00* (2013.01); *B32B 3/263* (2013.01); *B32B 7/08* (2013.01); *B60Y 2410/122* (2013.01); *Y10T 428/2405* (2015.01); *Y10T 428/24033* (2015.01); *Y10T 428/24041* (2015.01)

(58) Field of Classification Search
  CPC ..... Y10T 428/24033; Y10T 428/24041; Y10T 428/2405; B60R 13/02; B62D 65/14; B32B 7/08; B32B 3/263
  See application file for complete search history.

(56) References Cited

U.S. PATENT DOCUMENTS

2015/0130204 A1   5/2015   Takezawa et al.

FOREIGN PATENT DOCUMENTS

| JP | 2015-093601 | 5/2015 | |
| JP | 2015-160484 | 9/2015 | |
| WO | WO-2017053313 A1 * | 3/2017 | ............. B29C 43/00 |

OTHER PUBLICATIONS

U.S. Appl. No. 15/704,818 to Hironobu Iwasaki, filed Sep. 14, 2017.

* cited by examiner

*Primary Examiner* — Alexander S Thomas
(74) *Attorney, Agent, or Firm* — Greenblum & Bernstein, P.L.C.

(57) ABSTRACT

An interior part having high mechanical strength while having a stitch pattern penetrating a base-material layer is provided. Furthermore, a method for manufacturing an interior part that improves strength of the base-material layer and enhances sewing compatibility is provided.

The interior part includes a skin layer joined to one surface of a base-material layer. The base-material layer contains reinforcing fibers and a thermoplastic resin binding the reinforcing fibers. A thread sewn between an opposite surface of the base-material layer with respect to the one surface and a design surface of the skin layer forms a stitch pattern provided on the design surface. A sewn area of the base-material layer is thicker than the periphery. The method includes a shaping step of shaping a fiber-reinforced board in which the thermoplastic resin is softened and forming an area to be sewn thicker than the periphery by releasing compression.

9 Claims, 6 Drawing Sheets

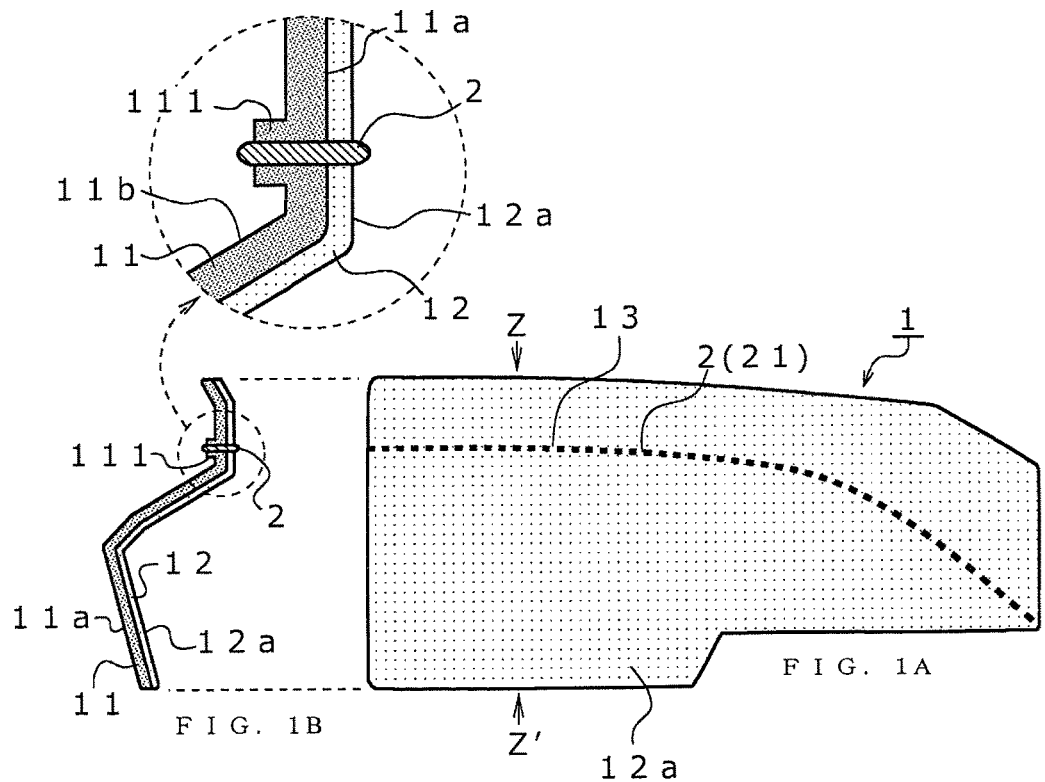
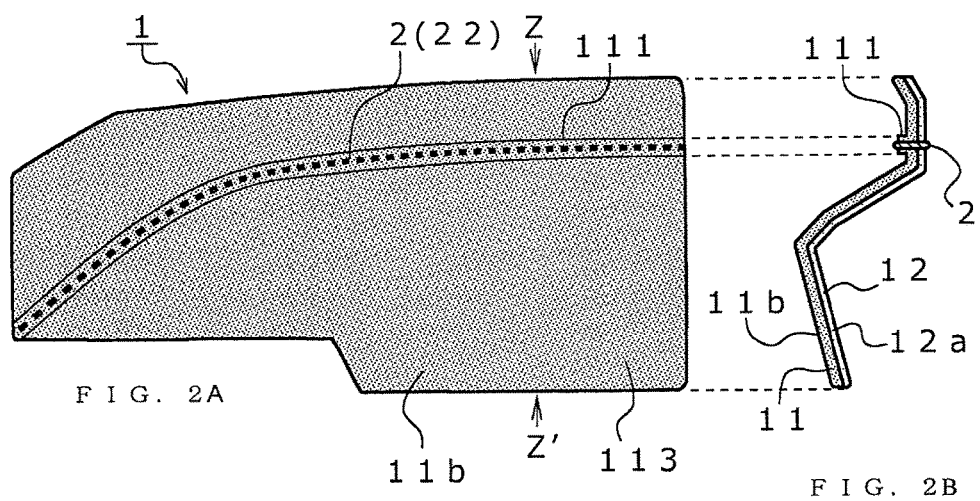

INTERIOR PART AND METHOD FOR MANUFACTURING THE SAME

CROSS REFERENCE TO RELATED APPLICATION

The present application claims priority under 35 U.S.C. § 119 of Japanese Patent Application No. 2016-182963, filed on Sep. 20, 2016, the disclosure of which is expressly incorporated by reference herein in its entirety.

BACKGROUND

1. Technical Field

The present invention relates to an interior part and a method for manufacturing the same. More specifically, the present invention relates to an interior part obtained by bonding a base body and a skin together, and method for manufacturing the same.

2. Related Art

On a design surface of an interior part including a skin such as a door trim or an instrument panel, a stitch pattern like line stitch can be provided by sewing. Thus, it is possible to impart a design that cannot be expressed by only the pattern of the skin, and it is possible to exhibit a higher design property. From such a viewpoint, attempts have been made to provide a stitch pattern by various methods. In particular, a known interior part is disclosed in each of JP 2015-160484 A and JP 2015-093601 A. The interior part is obtained by forming in advance a laminate in which a skin layer and a shaped base-material layer are laminated, and performing sewing with a sewing needle such that the sewing needle penetrates through the front and back surfaces of the laminate to form a stitch pattern on the design surface of the skin layer.

SUMMARY

The interior parts manufactured as disclosed in the above-described JP 2015-160484 A and JP 2015-093601 A are advantageous in that deformation of the stitch pattern can be prevented. For example, when a skin layer provided with a stitch pattern in advance is to be joined to a base-material layer which has been shaped by imparting an uneven shape or the like, there is a problem that a portion where the skin layer extends greater and a portion where the skin layer extends less mixedly exist according to the uneven shape imparted to the base-material layer, and the design of the stitch pattern deforms. In contrast, as described above, the stitch pattern formed by making the sewing needle penetrate the front and back of the laminate obtained by laminating the shaped base-material layer and the skin layer in advance is superior in that the design shape can be maintained.

JP 2015-160484 A and JP 2015-093601 A disclose that sewing can be more easily performed by decreasing the thickness of the portion of the base-material layer where the sewing needle penetrates upon sewing. That is, JP 2015-160484 A discloses a method in which a thin portion 7 (stitch formation area) thinner than the periphery is formed, on a base member 4 (paragraphs [0029] to [0030]). In contrast, JP 2015-093601 A discloses that by forming a recess 521, the thickness of a sewn portion 53 which is a bottom wall portion of the recess 521 becomes thinner than the periphery, and a stitch thread 41 can be easily sewn (paragraph [0045]).

However, since the base-material layer supports the skin layer and determines the strength of the interior part, it is necessary to have sufficient strength even if the thickness is made thin. Therefore, the base-material layer cannot be made excessively thin only from the viewpoint of ease of sewing. In addition, in order to perform sewing by penetrating a hard base-material layer having high strength with a sewing needle, it is necessary to perform sewing using a sufficiently thick sewing needle with a high sewing pressure. However, there is a problem that if the sewing needle is made thicker, the resistance generated when the sewing needle penetrates the base layer becomes greater and wear of the sewing needle also increases. If wear of the sewing needle increases, it is necessary to increase the number of times to stop operation of a sewing machine and exchange sewing needles, which is not preferable from the viewpoint of production efficiency. That is, there is a problem that it is still difficult to balance such various conditions with each other so as to facilitate sewing.

The present invention has been made in view of the above problem, and an object of the present invention is to provide an interior part capable of having a high mechanical strength while having a stitch pattern penetrating a base-material layer. Furthermore, an object of the present invention is to provide a method for manufacturing an interior part capable of making improvement in strength of a base-material layer and ease of sewing compatible at a high level.

[1] According to a non-limiting embodiment of the present application an interior part includes a base-material layer and a skin layer joined to one surface of the base-material layer, the base-material layer includes reinforcing fibers and a thermoplastic resin binding the reinforcing fibers together, a thread sewn between an opposite surface of the base-material layer with respect to the one surface and a design surface of the skin layer forms a stitch pattern provided on the design surface, and a sewn area in the base-material layer is thicker than a periphery of the sewn area.

[2] According to a non-limiting embodiment the sewn area is formed to be thick and protrude only on the opposite surface of the base-material layer.

[3] According to a non-limiting embodiment the stitch pattern is line stitch, and the sewn area is formed to have a thick line shape along the line stitch.

[4] According to a non-limiting embodiment the sewn area is thicker than the periphery by not less than 5%.

[5] According to a non-limiting embodiment fineness of the thread is from 500 dtex to 1300 dtex inclusive.

[6] According to a non-limiting embodiment the stitch pattern is line stitch, and the sewn area is formed to have a thick line shape along the line stitch.

[7] According to a non-limiting embodiment a method for manufacturing the interior part includes:

heating a fiber-reinforced board obtained by including the reinforcing fibers and the thermoplastic resin and being compressed to soften the thermoplastic resin;

shaping the fiber-reinforced board in which the thermoplastic resin is softened and forming an area to be sewn thicker than a periphery of the area to be sewn by releasing compression;

forming a laminate that includes the base-material layer formed by shaping the fiber-reinforced board and the skin layer joined to the one surface of base-material layer by joining the skin layer on one surface of the fiber-reinforced board at one of timings simultaneous with and after the shaping; and forming a stitch pattern by performing sewing between the opposite surface of the base-material layer and the design surface of the skin layer such that a sewing needle penetrates the area to be sewn.

[8] According to a non-limiting embodiment of the method, in the shaping, the fiber-reinforced board is shaped such that the area to be sewn is formed to be thick and protrude only on the opposite surface of the base-material layer.

[9] According to a non-limiting embodiment of the method the area to be sewn has a thick line shape.

[10] According to a non-limiting embodiment of the method the area to be sewn is thicker than the periphery by not less than 5%.

[11] According to a non-limiting embodiment of the method fineness of the thread constituting the stitch pattern is from 500 dtex to 1300 dtex inclusive.

[12] According to a non-limiting embodiment of the method the area to be sewn has a thick line shape.

An interior part 1 of the present invention includes a base-material layer 11, and a skin layer 12 joined to one surface 11a of the base-material layer 11. Among them, the base-material layer 11 includes reinforcing fibers and a thermoplastic resin binding the reinforcing fibers together. In addition, the interior part 1 includes a stitch pattern 13 formed on a design surface 12a of the skin layer 12 with a thread 2 sewn between an opposite surface 11b of the base-material layer 11 with respect to the one surface 11a and the design surface 12a of the skin layer 12. A sewn area 111 of the base-material layer 11 is thicker than a periphery 113 of the area 111.

Thus, the interior part 1 has the stitch pattern 13 formed with the thread 2 penetrating the base-material layer 11 and having a high design property. In addition, mechanical strength of the sewn area 111 where the stitch pattern 13 is arranged can be maintained higher than that in the periphery 113. That is, the density of the area 111 to be sewn obtained by making thicker the base-material layer 11 including the reinforcing fibers and the thermoplastic resin binding the reinforcing fibers is reduced. However, the area 111 has higher mechanical strength than that of the periphery 113 due to the increase in thickness. Therefore, although the area 111 to be sewn has the stitch pattern 13, the area 111 can have higher mechanical strength than that of the periphery 113.

Furthermore, since the area 111 to be sewn has density lower than that of the periphery 113 due to the increase in thickness, a sewing needle can more easily penetrate the area 111. Therefore, wear of the sewing needle can be suppressed, and the interior part 1 can be efficiently manufactured while making the thread 2 penetrate the base-material layer 11. Therefore, the interior part 1 including the stitch pattern 13 with a high design property and manufactured at a low cost is provided.

A method for manufacturing the interior part 1 according to the present invention includes:

a heating step of heating a fiber-reinforced board obtained by including the reinforcing fibers and the thermoplastic resin and being compressed, and softening the thermoplastic resin;

a shaping step of shaping the fiber-reinforced board in which the thermoplastic resin is softened and forming the area 111 to be sewn thicker than the periphery by releasing compression;

a laminate forming step of forming a laminate that includes the base-material layer 11 obtained by shaping the fiber-reinforced board and the skin layer 12 joined to the one surface 11a of the base-material layer 11 by joining the skin layer 12 to one surface of the fiber-reinforced board at one of timings simultaneous with and after the shaping step; and a stitch pattern forming step of forming the stitch pattern 13 by performing sewing between the opposite surface 11b of the base-material layer 11 and the design surface 12a of the skin layer 12 such that a sewing needle penetrates the area to be sewn.

Thus, the interior part 1 can be manufactured which has the stitch pattern 13 formed with the thread 2 penetrating the base-material layer 11 and having a high design property, and in which mechanical strength of the sewn area 111 where the stitch pattern 13 is arranged can be maintained higher than that in the periphery 113. That is, by shaping the fiber-reinforced board obtained by including the reinforced fibers and the thermoplastic resin and being compressed while forming the area 111 to be sewn thicker than the periphery by releasing compression, it is possible to form the area 111 to be sewn which is thick but is lower in density than the periphery 113, and therefore which a sewing needle can more easily penetrate. Therefore, wear of the sewing needle can be suppressed, and the interior part 1 having the stitch pattern 13 with a high design property can be manufactured efficiently.

Furthermore, since the area 111 to be sewn can have higher mechanical strength than that of the periphery 113 due to the increase in thickness, the area 111 to be sewn can still have mechanical strength higher than that of the periphery 113 even with the stitch pattern 13.

BRIEF DESCRIPTION OF DRAWINGS

The present invention will be further described in the following detailed description with reference to a plurality of mentioned drawings, by giving non-limiting examples of exemplary embodiments according to the invention. Like reference numerals denote like portions throughout several drawings.

FIGS. 1A to 1C are a plan view (a design surface 12a side of a skin layer 12) and cross-sectional views schematically illustrating an example of the interior part according to the present invention.

FIGS. 2A and 2B are a plan view (an opposite surface 11b side of the base-material layer 11) and a cross-sectional view schematically illustrating an example of the interior part according to the present invention.

DETAILED DESCRIPTION

Figure 3:
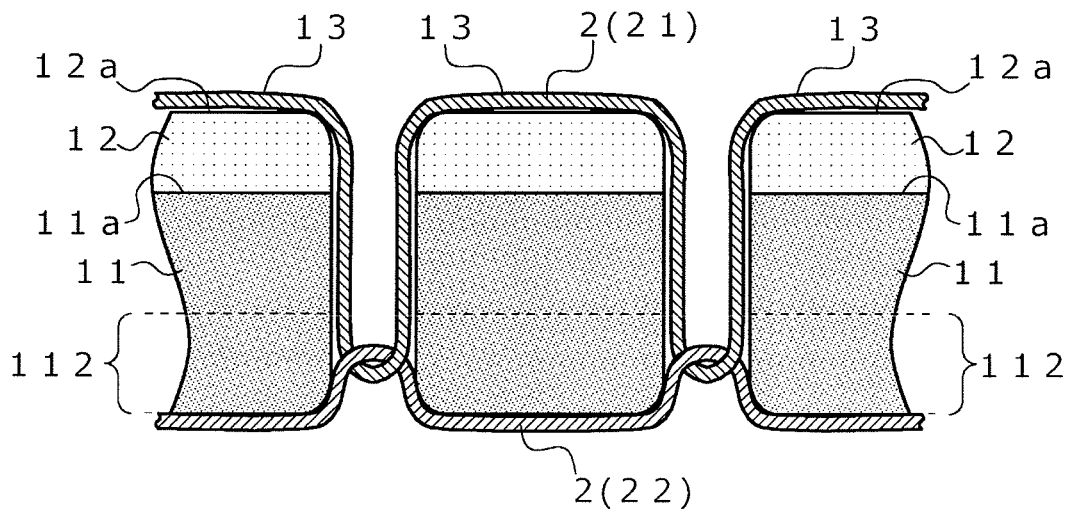
FIG. 3 is a partial cross-sectional view schematically illustrating an example of the interior part according to the present invention.
Figure 4:
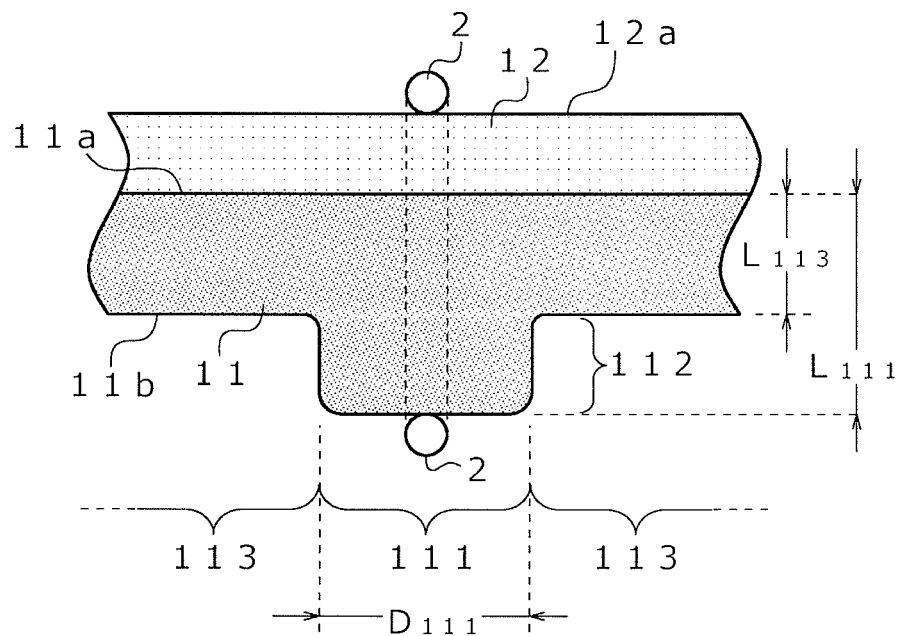
FIG. 4 is a partial cross-sectional view schematically illustrating an example of the interior part according to the present invention.

It is to be understood that the matters set forth herein are intended to be illustrative only and to exemplify embodiments of the present invention, and are described in order to explain the principles and conceptual features of the present invention in a most effective and most easy-to-understand way. In this respect, it is not intended to present the structural details of the present invention to the extent more than necessary for a fundamental understanding of the present invention but is intended to clarify to the person skilled in the art how some embodiments of the present invention are actually realized, by explanation in conjunction with the drawings.

[1] Interior Part

Hereinafter, embodiments of the present invention will be described with reference to the drawings.

An interior part (1) according to the present invention (see FIGS. 1A to 2B) is an interior part including a base-material layer (11) a skin layer (12) joined to one surface (11*a*) of the base-material layer (11), the base-material layer (11) includes reinforcing fibers and a thermoplastic resin binding the reinforcing fibers together, a thread (2) sewn between an opposite surface (11*b*) of the base-material layer (11) with respect to the one surface (11*a*) and a design surface (12*a*) of the skin layer (12) forms a stitch pattern (13) provided on the design surface (12*a*), and an area (111), which has been sewn, of the base-material layer (11) is thicker than the periphery.

Note that FIG. 1A is a plan view on a design surface 12*a* side of the skin layer 12. In addition, FIG. 1B is a cross-sectional view taken along line Z-Z' in FIG. 1A. Furthermore, FIG. 1C is a partially enlarged view illustrating the vicinity of the sewn area 111 in FIG. (B) in an enlarged manner.

In contrast, FIG. 2A is a plan view on an opposite surface 11*b* side of the base-material layer 11. In addition, FIG. 2B is a cross-sectional view taken along line Z-Z' in FIG. 2A.

The base-material layer 11 has a plate shape. That is, the base-material layer 11 is a layer having a substantially uniform thickness as a whole. In addition, the base-material layer 11 is usually shaped so as to have an uneven shape.

The base-material layer 11 includes reinforcing fibers, and a thermoplastic resin binding the reinforcing fibers together. The base-material layer 11 is not particularly limited as long as the base-material layer 11 includes reinforcing fibers and a thermoplastic resin binding the reinforcing fibers together. However, the base-material layer 11 is preferably a layer shaped by softening the thermoplastic resin in a pre-board (precursor of the base-material layer) in which the reinforcing fibers and the thermoplastic resin fibers are compressed collectively. This is because in the base-material layer 11 as described above, when a portion having a smaller thickness and a portion having a greater thickness are compared to each other, the density of the portion having the greater thickness is surely lower than the density of the portion having the smaller thickness.

The above-described pre-board can be obtained by mixing the reinforcing fibers and thermoplastic resin fibers obtained by forming into fiber shapes the thermoplastic resin to be used to bind the reinforcing fibers together (mixing the fibers), and compressing the mixed fibers into a plate shape.

The pre-board usually has a flat shape. The base-material layer 11 is obtained by heating the pre-board to soften the thermoplastic resin contained in the pre-board, and then imparting the above-described uneven shape by cold pressing. In the base-material layer 11 thus obtained, restraint of the reinforcing fibers by the thermoplastic resin (thermoplastic resin fibers) solidified in the pre-board is relaxed by springback action of the reinforcing fibers, and the base-material layer 11 is shaped to be thicker as a whole than the initial thickness of the pre-board. Therefore, the density of the portion having a greater thickness is lower than the density of the portion having a smaller thickness.

In the interior part 1 according to the present invention, the sewn area 111 of the base-material layer 11 is formed thicker than the periphery. Therefore, the density of the sewn area 111 is lower than that of the periphery. In other words, the density of a thick portion (the sewn area 111) is lower than a non-thick portion in the periphery. This difference in density is not specifically limited. For example, assuming that the density of the thick portion (the sewn area 111) is X (g/cm$^3$) and the density of the non-thick portion (the periphery 113 of the sewn area 111) is Y (g/cm$^3$), X and Y may be any as long as X/Y<1 is satisfied. $0.50 \leq X/Y \leq 0.95$ is preferably satisfied, $0.55 \leq X/Y \leq 0.90$ is more preferably satisfied, $0.60 \leq X/Y \leq 0.85$ is particularly preferably satisfied, and $0.65 \leq X/Y \leq 0.80$ is most preferably satisfied.

Specific ranges of the density X (g/cm$^3$) and the density Y (g/cm$^3$) are not particularly limited; however, for example, the density Y (g/cm$^3$) can be set to satisfy $0.30 \leq Y \leq 0.90$. $0.33 \leq Y \leq 0.86$ is preferable, $0.37 \leq Y \leq 0.83$ is more preferable, and $0.40 \leq Y \leq 0.80$ is particularly preferable.

Note that the density can be measured by the following method. That is, a measurement piece having a predetermined size for density measurement is cut out from each of the non-thick portion (the periphery 113 of the sewn area 111) and the thick portion 112, and the measurement pieces are used to measure the density. Length (L), width (W), and thickness (D) for density measurement are measured (a caliper and/or a micrometer can be used). For each of the length, the width, and the thickness for density calculation, an average value of values measured at five different randomly selected spots is used. In addition, the measurement piece the above-described length, width, and thickness of which were measured is used to obtain weight (S) for density measurement. The average value of the weight values obtained in measurement performed five times (an electronic scale can be used) is used as the weight (S). It is assumed that the value calculated by S/(L×W×D) based on these measured values is the above density.

Examples of the reinforcing fibers include inorganic fibers (such as glass fibers) and organic fibers (natural fibers such as plant fibers and animal fibers). One kind of them may be used, or two or more kinds of them may be used in combination. Among the above fibers, organic fibers are preferable, furthermore natural fibers are preferable, and plant fibers are particularly preferable. The plant fiber is a fiber derived from a plant. Examples of the plant fiber include a fiber taken out of a plant and a fiber produced by processing the fiber. Examples of the plant fiber include a vein fiber, a bast fiber, a wooden fiber, and other plant fibers. One kind of them may be used, or two or more kinds of them may be used in combination.

Among them, examples of the vein fiber include abaca, sisal, and agave. In addition, examples of the bast fiber include flux, jute, hemp, kenaf, and ramie. Further, examples of the wooden fiber include plant fibers collected from a broad-leaf tree, a coniferous tree and the like. Other examples of the plant fiber include a coconut shell fiber, an oil palm empty fruit bunch fiber, a rice straw fiber, wheat straw fiber, bamboo fiber, and cotton. Among them, the vein fiber, the bast fiber, and other plant fibers are preferable.

The fiber length of the plant fiber is not particularly limited; however, the average fiber length is preferably 10 to 200 mm, more preferably 20 to 170 mm, particularly preferably 30 to 150 mm.

The fiber diameter of the plant fiber is not particularly limited; however, the average fiber diameter is preferably 0.01 to 2.5 mm, more preferably 0.1 to 2.0 mm, particularly preferably 0.3 to 1.5 mm.

Note that the above-described average fiber length is in accordance with JIS L1015, and is the average value of 200 single fibers taken out one by one randomly by the direct method, and put straight without being stretched. The fiber length of each single fiber was measured on a measuring stick. The average fiber diameter is measured using the total of 200 plant fibers used for measuring the average fiber length. That is, average fiber diameter is the average value of the values of fiber diameters at the center in the longitudinal direction of the plant fibers measured using an optical microscope.

The kind of the thermoplastic resin which binds fiber materials is not particularly limited; however, a polyolefin resin, a polyester resin, a polystyrene resin, an acrylic resin, a polyamide resin, a polycarbonate resin, a polyacetal resin, an ABS resin and the like can be used. One kind of them may be used, or two or more kinds of them may be used in combination.

Examples of the polyester resin include polylactic acid, an aliphatic polyester resin, and an aromatic polyester resin. Examples of the aliphatic polyester resin include polycaprolactone and polybutylene succinate. Further, examples of the aromatic polyester resin include polyethylene terephthalate, polytrimethylene terephthalate, polybutylene terephthalate, and polyethylene naphthalate. In addition, examples of the acrylic resin include various resins obtained using methacrylate, acrylate, or the like.

Among the thermoplastic resins, the polyolefin resin is preferable. Examples of the olefin monomer constituting the polyolefin resin include ethylene, propylene, 1-butene, 3-methyl-1-butene, 1-pentene, 3-methyl-1-pentene, 4-methyl-1-pentene, 1-hexene, and 1-octene. One kind of them may be used, or two or more kinds of them may be used in combination.

That is, examples of the polyolefin resin include polyethylene resins such as an ethylene homopolymer, an ethylene-1-butene copolymer, an ethylene-1-hexene copolymer, and an ethylene-4-methyl-1-pentene copolymer. In these polyethylene resins, 50% or more of the total number of constitutional units are units derived from ethylene. Furthermore, examples of the polyolefin resin include polypropylene resins such as a propylene homopolymer, a propylene-ethylene copolymer (a propylene-ethylene random copolymer, or the like), and a propylene-1-butene copolymer. In the above polypropylene resins, 50% or more of the total number of constitutional units are units derived from propylene.

The thermoplastic resin contained in the present fiber board may be only a non-modified thermoplastic resin, but may also contain a modified thermoplastic resin by introducing a polar group. Examples of the polar group include a carboxylic acid anhydride group (—CO—O—OC—), a carboxylic acid group (—COOH), a carbonyl group (—CO—), a hydroxyl group (—OH), an amino group (—NH$_2$) a nitro group (—NO$_2$), and a nitrile group (—CN). One kind of them may be used, or two or more kinds of them may be used in combination.

The ratio of the reinforcing fibers and the thermoplastic resin contained in the base-material layer 11 is not particularly limited. However, assuming that the total of the reinforcing fibers and the thermoplastic resin contained in the base-material layer 11 is 100 mass %, the ratio of the reinforcing fibers can be set to 10 mass % or more and 90 mass % or less, preferably 15 mass % or more and 85 mass % or less, more preferably 15 mass % or more and 85 mass % or less, still more preferably 20 mass % or more and 80 mass or less, further more preferably 25 mass % or more and 75 mass % or less, particularly preferably 30 mass % or more 70 mass % or less, more particularly preferably 35 mass % or more and 65 mass % or less, and most preferably 40 mass % or more and 60 mass % or less.

The skin layer 12 is a layer joined to the one surface 11a of the base-material layer 11, and the outer surface of the skin layer 12 is a layer serving as the design surface 12a of the interior part 1 (see FIGS. 1A to 1D). That is, the skin layer 12 is a layer serving as a design surface of the interior part 1. In a case where the base-material layer 11 has an uneven shape, the skin layer 12 can be joined to the one surface 11a of the base-material layer 11 so as to follow the uneven shape.

The constitution of the skin layer 12 is not particularly limited, and may be made of only one layer, or may be made of two or more layers. In the case where the skin layer 12 is made of two or more layers, for example, the skin layer 12 may be made of a laminate including a surface layer (for example, synthetic leather or woven fabric) having the design surface 12a and a cushion layer (disposed on a non-design surface side of the skin layer 12). The cushion layer is a layer having elasticity. The cushion layer can give resilient feeling to touch sensation applied to the design surface 12a of the skin layer 12. The material constituting the cushion layer is not limited; however, soft polyurethane foam can be used, for example. In addition, another soft resin foam, a nonwoven fabric sheet, or the like may be used as long as the material has a sufficient cushioning property. In addition, a nonwoven fabric layer, a ventilation prevention layer and the like may be provided as necessary.

In addition to the above-described surface layer and cushion layer, another layer may be provided. As the other layer, various joining layers for joining layers such as the surface layer and the cushion layer can be interposed. Examples of the joining layer include an adhesive and a thermoplastic resin layer for joining. Examples of the joining layer further include a ventilation suppression layer for suppressing ventilation of the interior part 1 in the stacking direction. Only one of these layers may be used or two or more layers of these layers may be used in combination.

Further, the interior part 1 includes the stitch pattern 13 formed on the design surface 12a of the skin layer 12 with the thread 2 sewn between the opposite surface 11b of the base-material layer 11 with respect to the one surface 11a and the design surface 12a of the skin layer 12 (see FIGS. 1A to 4). That is, the stitch pattern 13 is formed by the sewn thread 2 penetrating from the opposite surface 11b of the base-material layer 11 to the design surface 12a of the skin layer 12. Usually, the stitch pattern 13 is a thread line in which the sewn thread 2 appears on the design surface 12a. Examples of the stitch pattern 13 described above include line stitch, cross stitch, and embroidery (mark, logo, character, and the like). One kind of them may be used, or two or more kinds of them may be used in combination.

Among them, the line stitch is a line-shaped thread line, and may be a straight thread line or a curved thread line. In addition, the line stitch may be formed of one thread line or may be formed of two or more (plural) thread lines arranged in parallel such that the thread lines are viewed as a line shape as a whole.

The cross stitch is formed of a plurality of line stitches arranged so as to cross each other. The intersection angle between the line stitches is not limited. By using the cross stitch as described above, a quilting pattern can be formed, for example.

Embroidery is an aggregate of thread lines appearing on the design surface 12a, and is the stitch pattern 13 which forms a more complicated pattern than a line shape as a whole. That is, examples of the embroidery include the stitch patterns 13 such as a mark, a logo, a character, a figure, and a picture pattern.

Specifically, examples of the stitch pattern 13 include the line stitch and the embroidery formed on each part of a door trim of an automobile, various trim parts such as an armrest, an upper trim, a decorative panel, an ornament panel, a lower trim, a pocket (door trim pocket), and a quarter trim, a side garnish, a back door trim, and the like.

Since the stitch pattern 13 is provided on the area 111 (sewn area 111) of the base-material layer 11 sewn by the thread 2, the area 111 is thicker than the periphery. That is, as described above, since the sewn area 111 of the base-material layer 11 is thick, density X (g/cm$^3$) of this portion is smaller than density Y (g/cm$^3$) of the periphery of this portion. Therefore, a sewing needle can more easily penetrate this portion when the stitch pattern 13 is formed, and mechanical strength of this portion can be maintained high even though sewing is performed by making the sewing needle penetrate the base-material layer 11.

That is, as described above, in the base-material layer 11, the density of a portion with a greater thickness is lower than the density of a portion with a smaller thickness. Therefore, the density of the area 111 to be sewn thicker than the periphery in the base-material layer 11 becomes relatively lower than that of the periphery, and therefore the sewing needle can be made to penetrate the area 111 more easily than to penetrate the periphery. Thus, wear of the sewing needle can be suppressed, the number of times to replace sewing needles attached to a sewing machine can be reduced, and production efficiency can be improved. Note that a preparatory hole may be provided in the area 111 to be sewn. However, normally the preparatory hole is not necessary and there is no need to form in advance a preparatory hole through which a sewing needle passes. The sewing needle can penetrate the area 111 without a preparatory hole. This is remarkable in a case where plant fibers are used as reinforcing fibers.

In addition, while density of the area 111 to be sewn is lower than that of the periphery, the area 111 is thicker. Thus, the area 111 to be sewn can have a higher flexural modulus than that of the periphery. Therefore, even though the sewing needle penetrates the area 111 by sewing, mechanical strength of the sewn area 111 is prevented from becoming smaller than that of the periphery. For example, even if line stitch is formed as the stitch pattern 13, a line-shaped portion whose mechanical strength is lower than that in the periphery is not formed and the interior part 1 excellent in impact resistance can be obtained.

The sewn area 111 is formed to be thicker than the periphery 113 so as to include an area which the thread 2 penetrates by sewing.

For example, in a case where the stitch pattern 13 is line stitch, a protruding strip formed along the line stitch can be provided as a thick area. That is, the base-material layer 11 may have a ridge (protruding strip) protruding on the opposite surface and line stitch as the stitch pattern 13 formed by sewing the thread 2 along a protrusion vertex of the ridge.

In addition, for example, in a case where the stitch pattern 13 is cross stitch, a protruding strip formed along the cross stitch may be provided as the thick area. That is, the base-material layer 11 may have ridges (protruding strips) protruding on the opposite surface and arranged in a lattice shape, and includes the cross stitch as the stitch pattern 13 formed along protrusion vertices of the ridges.

Furthermore, for example, in a case where the stitch pattern 13 is embroidery, ridges (protruding strips) corresponding to and provided along the thread lines constituting the embroidery may be provided as the thick area. A protruding area corresponding to the area where the embroidery is formed may be provided such that the entire embroidery is included in the protruding area. That is, in a predetermined area of the base-material layer 11, the thick area protruding on the opposite surface of the base-material layer 11 and formed thicker than the other portion is provided, and embroidery as the stitch pattern 13 may be provided on the thick area.

Note that it is preferable to have a thick area corresponding to entirety of the line stitch, the cross stitch and the embroidery. However, it should be understood that the effect of the present invention is sufficiently obtained even in a mode where a corresponding thick area is not provided for part of the line stitch, the cross stitch or the embroidery.

The specific thickness of the sewn area 111 is not limited; however, it is preferable that the sewn area 111 be thicker than the periphery 113 by 5% or more. That is, assuming that the thickness of the periphery 113 of the base-material layer 11 is $L_{113}$ (mm), the thickness of the sewn area 111 of the base-material layer 11 is $L_{111}$ (mm), and the thickness of the thick portion 112 is $L_{112}$ (mm) ($L_{112}=L_{111}-L_{113}$) (see FIGS. 4 and 5), the ratio of the thickness $L_{112}$ of the thick portion 112 to the thickness $L_{113}$ of the periphery 113 of the base-material layer 11 ($L_{112}/L_{113}$) is preferably ($L_{112}/L_{113}$) ≥0.05. Since $L_{112}/L_{113}$ is 0.05 or more, superior density reduction and mechanical strength improvement of the area 111 to be sewn (the sewn area 111 after sewing) can be obtained. Therefore, the stitch pattern 13 can be formed where sewing is easy and mechanical strength is not lowered. The ratio ($L_{112}/L_{113}$) is more preferably 0.08≤($L_{112}/L_{113}$)≤1.5, further preferably 0.10≤($L_{112}/L_{113}$)≤1.0, and still more preferably 0.13≤($L_{112}/L_{113}$)≤0.9, particularly preferably 0.16≤($L_{112}/L_{113}$)≤0.8, and most preferably 0.18≤($L_{112}/L_{113}$)≤0.7.

In addition, the width of the thick area is not particularly limited, as long as the thick area includes an area which the thread 2 penetrates by sewing. For example, assuming that the fineness of the thread 2 used for sewing is S (dtex) and the width of the thick area (area 111 to be sewn) of the base-material layer 11 is $D_{111}$ (mm) (see FIGS. 4 and 5), the ratio ($S/D_{111}$) is preferably 100 or more. The ratio ($S/D_{111}$) is more preferably 100≤($S/D_{111}$)≤800, further preferably 150≤($S/D_{111}$)≤600, still more preferably 180≤($S/D_{111}$)≤500, particularly preferably 200≤($S/D_{111}$)≤450, and most preferably 250≤($S/D_{111}$)≤400.

Figure 5:
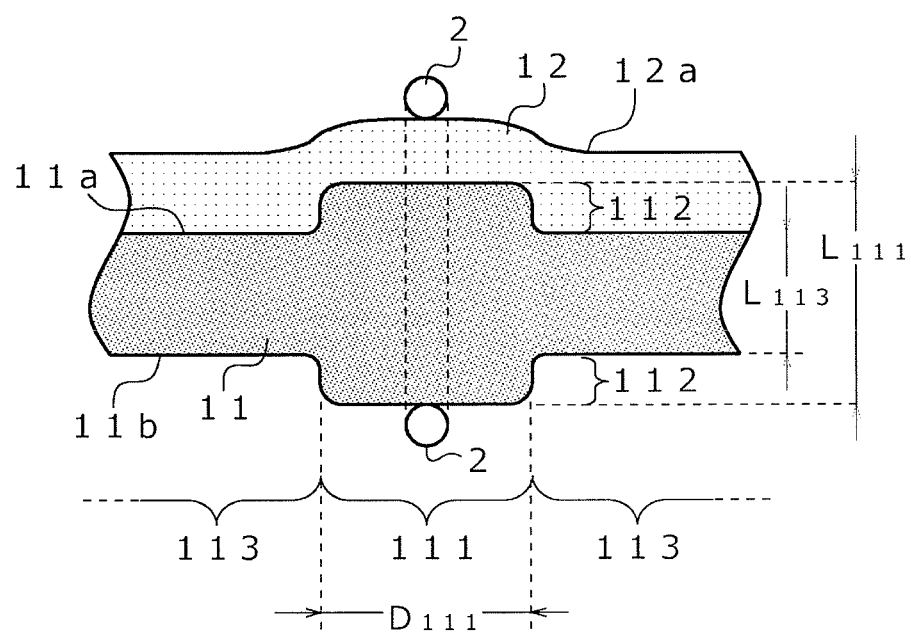
FIG. 5 is a partial cross-sectional view schematically illustrating another example of the interior part according to the present invention.

The sewn area 111 may protrude on the one surface 11a of the base-material layer 11 to form the thick portion 112 or may protrude on the opposite surface 11b of the base-material layer 11 to form the thick portion 112 (see FIG. 4), and furthermore, may protrude on both the one surface 11a and the opposite surface 11b of the base-material layer 11 to form the thick portion 112 (see FIG. 5). Among them, it is preferable that the sewn area 111 protrude to be thick only on the opposite surface 11b of the base-material layer 11. That is, it is preferable that the thick portion 112 be formed to protrude on the opposite surface 11b of the base-material layer 11 (see FIG. 4). In this case, flatness of the design surface 12a is more likely to be maintained than in the case where the thick portion 112 is formed to protrude on the one surface 11a of the base-material layer 11.

The stitch pattern 13 may be formed by penetrating one thread 2 between the opposite surface 11b of the base-material layer 11 and the design surface 12a of the skin layer 12, or may be sewn with an upper thread 21 and a lower thread 22 such that the upper thread 21 and the lower thread 22 penetrate the opposite surface 11b of the base-material layer 11 and the design surface 12a of the skin layer 12 from above and below, respectively (see FIG. 3). From among the above, the latter is preferable. Furthermore, in the case of using the upper thread 21 and the lower thread 22, it is preferable to make the fineness of the upper thread 21 greater than the fineness of the lower thread 22.

Furthermore, the stitch pattern 13 may be any form. For example, the line-shaped stitch pattern 13 (that is, line stitch) is possible, the cross-stitch-shaped stitch pattern 13 in which the line-shaped stitch patterns 13 are crossed is possible, and a drawing represented by a group of the line-shaped stitch patterns 13 (that is, embroidery) is possible.

Among them, in the interior part 1 of the present invention, the effect of the invention can be particularly remarkably exhibited particularly in a case where the stitch pattern 13 is line stitch. Therefore, line stitch is preferable. In a case where the stitch pattern 13 is line stitch, it is preferable that the sewn area 111 be formed to have a thick line shape along the line stitch. That is, it is preferable that the base-material layer 11 have a ridge (protruding strip) protruding on the opposite surface, and line stitch as the stitch pattern 13 formed by sewing the thread 2 along a protrusion vertex of the ridge.

Examples of the line stitch include line stitch formed on each part of a door trim of an automobile, specifically, various trim parts such as an armrest, an upper trim, a decorative panel, an ornament panel, a lower trim, a pocket (door trim pocket), and a quarter trim, a side garnish, a back door trim, and the like.

The material and fineness of the thread 2 constituting the stitch pattern 13 is not limited. In particular, fineness is preferably from 500 dtex to 1300 dtex inclusive, more preferably 570 dtex to 1250 dtex inclusive, and particularly preferably from 640 dtex to 1230 dtex inclusive.

In addition, as described above, in the case of forming the stitch pattern 13 using the upper thread 21 and the lower thread 22 and making the fineness of the upper thread 21 greater than the fineness of the lower thread 22, the fineness of the upper thread 21 is preferably from 850 dtex to 1300 dtex inclusive, more preferably from 900 dtex to 1250 dtex inclusive, and particularly preferably from 950 dtex to 1200 dtex inclusive. In contrast, the fineness of the lower thread 22 is preferably equal to or greater than 500 dtex and less 850 dtex, more preferably from 550 dtex to 825 dtex inclusive, and particularly preferably from 600 dtex to 800 dtex inclusive.

[2] Method for Manufacturing Interior Part

Figure 6:
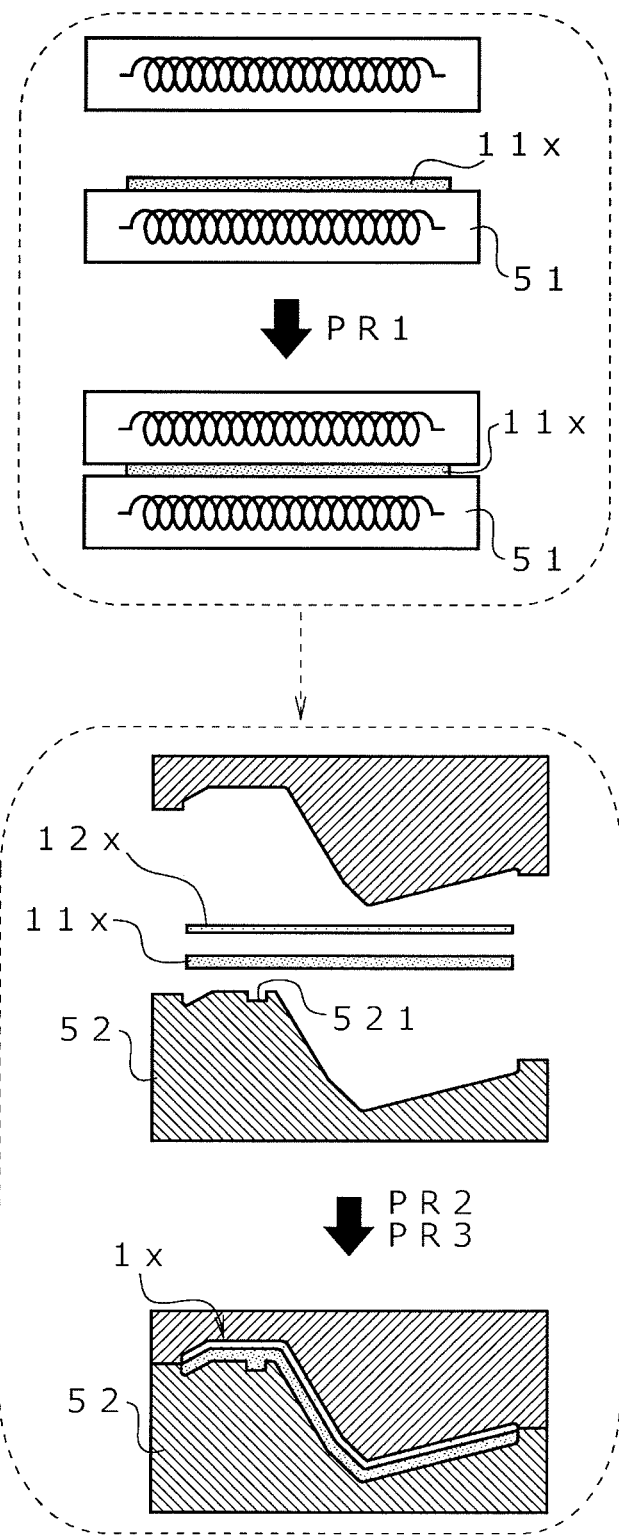
FIG. 6 is an explanatory view schematically illustrating an example of a method for manufacturing an interior part according to the present invention.
Figure 7:
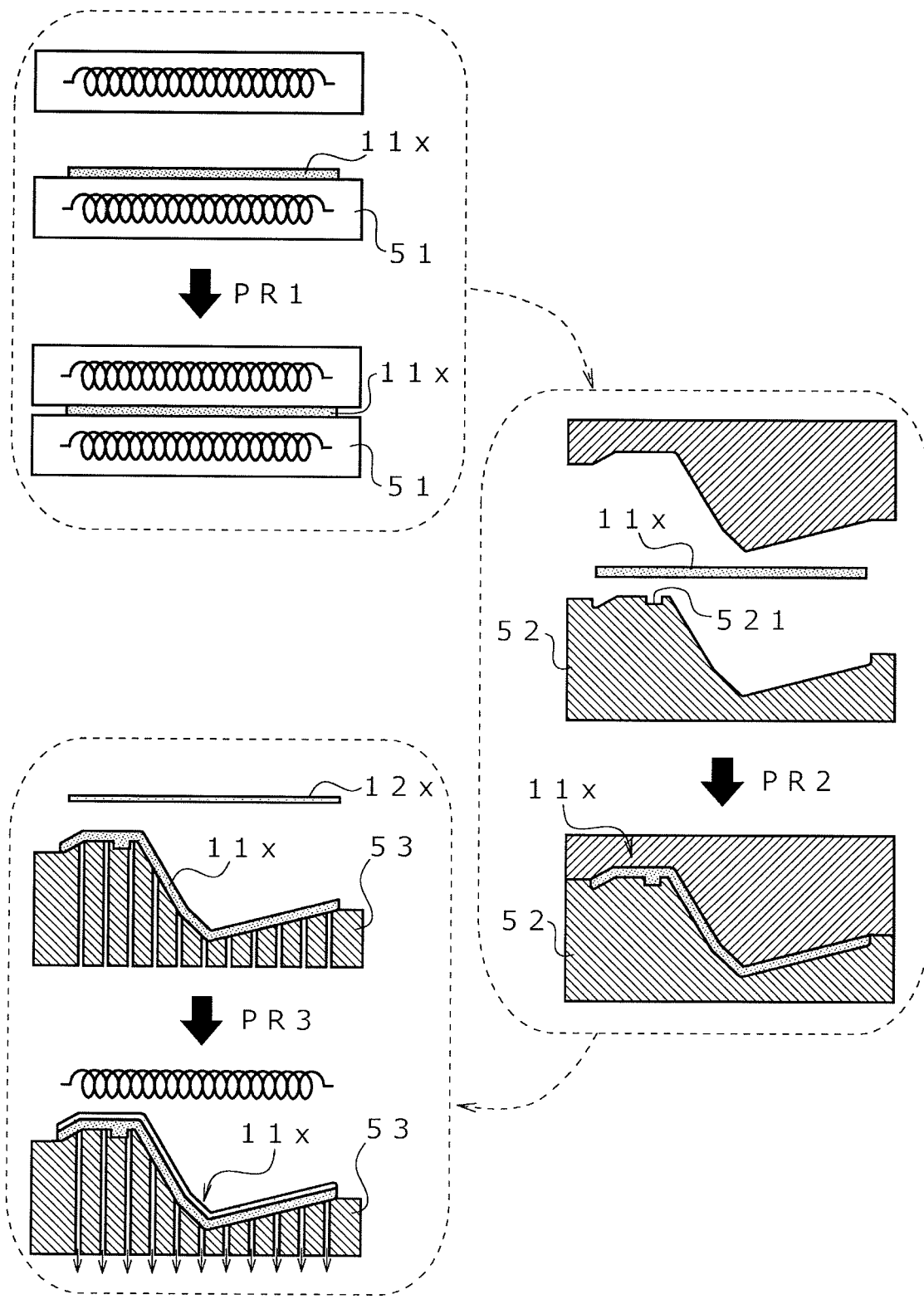
FIG. 7 is an explanatory view schematically illustrating another example of the method for manufacturing an interior part according to the present invention.
Figure 8:
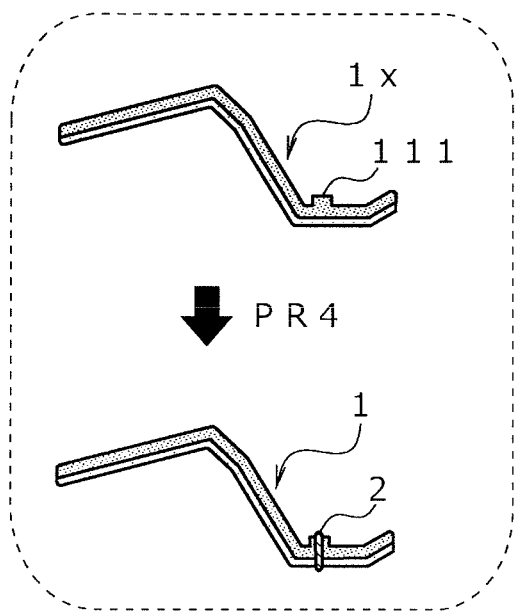
FIG. 8 is an explanatory view schematically illustrating an example of the method for manufacturing an interior part according to the present invention.

A method for manufacturing an interior part according to the present invention is a method for manufacturing the above-described interior part (1) and includes:

a heating step (PR1) of heating a fiber-reinforced board (11x) obtained by including the reinforcing fibers and the thermoplastic resin and being compressed to soften the thermoplastic resin;

a shaping step (PR2) of shaping the fiber-reinforced board (11x) in which the thermoplastic resin is softened and forming the area (111) to be sewn thicker than the periphery of the area to be sewn by releasing compression;

a laminate forming step (PR3) of forming a laminate (1x) including the base-material layer 11 obtained by shaping the fiber-reinforced board (11x) and the skin layer (12) joined to the one surface (11a) of the base-material layer 11 by joining a skin layer (12x) to one surface of the fiber-reinforced board (11x) simultaneously with or after the shaping step (PR2); and a stitch pattern forming step (PR4) of forming the stitch pattern (13) by performing sewing between the opposite surface (11b) of the base-material layer 11 and the design surface (12a) of the skin layer (12) such that a sewing needle penetrates the area (111) to be sewn (see FIGS. 6 to 8).

The above heating step (PR1) is a step of heating the fiber-reinforced board 11x to soften the thermoplastic resin contained in the fiber-reinforced board 11x. The fiber-reinforced board 11x used in this step is a precursor that becomes the base-material layer 11 in the interior part 1. The fiber-reinforced board 11x is a plate-like body obtained by including the reinforcing fibers and the thermoplastic resin and being compressed, and usually has a flat plate shape. The thickness (the thickness before the heating step) of the fiber-reinforced board 11x may be, for example, 1 mm or more and 10 mm or less.

The reinforcing fiber and the thermoplastic resin are as described above. In the heating step PR1, the fiber-reinforced board 11x may be heated in any way. However, it is preferable to heat the fiber-reinforced board 11x while applying pressure so that compression is not excessively released by heating. From such a viewpoint, it is preferable to heat the fiber-reinforced board 11x by using a hot press machine 51 (see FIGS. 6 and 7).

Heating conditions and the like of the fiber-reinforced board 11x can be appropriately set depending on the constituent material and the like of the fiber-reinforced board 11x. Specifically, for example, in a case where the contained thermoplastic resin is polyolefin, it is preferable to heat the fiber-reinforced board 11x to 70° C. or higher (temperature inside the fiber reinforced board 11x). The heating temperature is preferably from 80° C. to 150° C. inclusive, more preferably from 85° C. to 130° C. inclusive, and particularly preferably from 90° C. to 120° C. inclusive.

The above shaping step (PR2) is a step of shaping the fiber-reinforced board 11x in which the thermoplastic resin is softened and forming the area 111 to be sewn thicker than the periphery 113 by releasing compression.

This step can be carried out by using, for example, a cold press machine 52 (see FIGS. 6 and 7). Then, shaping thickness can be controlled by changing clearance of a cavity. Specifically, in an area of the cavity corresponding to the area 11 to be sewn, the recess 521 having greater clearance than that of the area corresponding to the periphery 113 of the base-material layer 11 is provided in the cavity, and cold pressing is performed. Therefore, it is possible to form the area 111 to be sewn thicker than the periphery 113. That is, in an area where the clearance is greater, since restraint of the reinforcing fibers by the thermoplastic resin is released more than that in the periphery 113, compression is released and the area 111 to be sewn thicker than the periphery can be formed. Due to this action, the area 111 to be sewn can be made into an area having a higher mechanical strength than that of the periphery 113 while the area 111 is a low-density area where the sewing needle can easily penetrate.

Molding conditions upon cold press molding are not particularly limited. However, for example, mold temperature upon molding can be set from 20° C. to 60° C. inclusive. In addition, mold clamping time can be set from 30 seconds to 60 seconds inclusive.

Note that the area 111 to be sewn in the laminate 1x before the stitch pattern 13 is provided and the sewn area 111 in the interior part 1 after the stitch pattern 13 is provided differ from each other only in the presence or absence of the stitch pattern 13, and shapes, widths, thicknesses and the like of the above areas 111 are usually identical regardless of the presence or absence of the stitch pattern 13. Accordingly, as a mode of the area 111 to be sewn, the above description of the sewn area 111 can be applied as it is.

The above laminate forming step (PR3) is a step of forming the laminate 1x including the base-material layer 11 obtained by shaping the fiber-reinforced board 11x and the skin layer 12 joined to the one surface 11a of the base-material layer 11, by joining the skin layer 12x to one surface of the fiber-reinforced board 11x simultaneously with or after the shaping step (PR2). The skin layer 12x to be joined in the laminate forming step PR3 is a precursor to be the skin layer 12 of the interior part 1, and is a precursor skin layer 12x.

As illustrated in FIG. 6, this laminate forming step PR3 can be carried out simultaneously with the shaping step PR2. That is, by introducing the precursor skin layer 12x together with the heated fiber-reinforced board 11x into the cold press machine 52 and collectively pressing them, the precursor skin layer 12x can be joined to the one surface of the fiber-reinforced board 11x simultaneously with shaping of the fiber-reinforced board 11x.

In addition, as illustrated in FIG. 7, this laminate forming step PR3 can be carried out separately from the shaping step PR2. That is, the shaped fiber-reinforced board 11x is set on a suction table 53, the precursor skin layer 12x is sucked to the one surface of the fiber-reinforced board 11x by sucking the opposite surface of the shaped fiber-reinforced board 11x, and the precursor skin layer 12x is heated. Thus, the precursor skin layer 12x can be joined to the shaped fiber-reinforced board 11x. Since the fiber-reinforced board 11x has porosity as described above, suction as described above is possible.

Upon joining, in a case where a thermoplastic resin is contained in each of the fiber-reinforced board 11x and the precursor skin layer 12x, the fiber-reinforced board 11x and the precursor skin layer 12x can be joined to each other with the thermoplastic resin softened and melted. An adhesive can be used alone or together with the thermoplastic resin.

The stitch pattern forming step (PR4) is a step of performing sewing between the opposite surface 11b of the base-material layer 11 and the design surface 12a of the skin layer 12 so that the sewing needle penetrates the area 111 to be sewn, and forming the stitch pattern 13 (see FIG. 8). This step is not particularly limited, and can be carried out using a conventionally known method. The material constituting the thread 2 is not limited, and for example, a polyester yarn, a nylon yarn, or the like can be appropriately used.

In this step, sewing is performed by making the sewing needle penetrate the area 111 to be sewn which is thicker than the periphery 113 and thus whose density is lower. Therefore, it is possible to prevent lowering of mechanical strength of the portion where the stitch pattern 13 is formed while achieving ease of sewing and suppression of wear of the sewing needle.

As described above, the sewn area 111 of the interior part 1 can be formed to be thick and protrude only on the opposite surface 11b of the base-material layer 11. Therefore, in the manufacturing method, the fiber-reinforced board 11x can be shaped so that the area 111 to be sewn is thick and protrudes only on the opposite surface 11b of the base-material layer 11 in the shaping step.

In addition, in the interior part 1, the stitch pattern 13 is line stitch, and the sewn area 111 can be formed to have a thick line shape along the line stitch. Therefore, it is possible to form the area 111 to be sewn having a thick line shape in the manufacturing method.

Furthermore, in the interior part 1, the sewn area 111 can be made thicker than the periphery by 5% or more. In order to provide the interior part as describe above, the area 111 to be sewn can be made thicker than the periphery 113 by 5% or more in the manufacturing method.

EXAMPLES

Hereinafter, the present invention will be specifically described with reference to Examples.

[1] Preparation of Test Piece

Reinforcing fibers and thermoplastic resin fibers were mixed at a mass ratio of 50:50 and then were compressed to prepare a fiber-reinforced board 11x having a thickness of 2 mm {the reinforcing fiber was kenaf fiber having an average fiber length of 70 mm, and the thermoplastic resin fiber was a synthetic fiber (6 dtex, average fiber length 51 mm) obtained by spinning polypropylene (mixed resin, unmodified:modified=95 mass %:5 mass %)}.

This fiber-reinforced board 11x was clamped, heated, and pressed by a hot press machine 51 (hydraulic press device equipped with a heater) to obtain the fiber reinforced board 11x heated to 210° C. (heating step PR1).

Next, the fiber-reinforced board 11x in a heated state was supplied to a cold press machine 52 and molded for 30 to 60 seconds at 20 to 60° C. Thus, as illustrated in FIGS. 2A and 2B, the fiber-reinforced board 11x is shaped to have a shape in which the line-shaped area 111 to be sewn (width $D_{111}$=1 cm) was provided on the opposite surface 11b of the base-material layer 11, and the skin layer 12 was joined to the one surface 11a of the fiber-reinforced board 11x to obtain a laminate 1x (shaping step PR2 and laminate forming step PR3).

At that time, the following four types of laminates 1x were obtained which were different from one another in the thickness of the thick portion 112 of the area 111 to be sewn.

Laminate 1x(1): thickness of periphery 113: 2.5 mm, thickness of area 111 to be sewn: 2.0 mm Laminate 1x(2): thickness of periphery 113: 2.5 mm, thickness of area 111 to be sewn: 2.5 mm Laminate 1x(3): thickness of periphery 113: 2.5 mm, thickness of area 111 to be sewn: 3.0 mm Laminate 1x(4): thickness of periphery 113: 2.5 mm, thickness of area 111 to be sewn: 3.5 mm Note that density of the area of the periphery 113 (thickness 2.5 mm) of each of the laminates 1x(1) to (4) is 0.60 g/cm$^3$.

Line stitch was formed by sewing at a center portion in the width of each of the areas 111 to be sewn of the laminates 1x(1) to (4) (in Comparative Examples, the portion corresponding to the area 111 to be sewn) obtained so far with a polyester yarn having fineness of 1180 dtex (yarn count 5)

used as the upper thread 21 and a polyester yarn having fineness of 740 dtex (yarn count 8) used as the lower thread 22. Thus, the four kinds of interior parts 1 of Examples 1 to 2 and Comparative Examples 2 to 3 were obtained (sewing needle with needle number 24 was used). Further, as Comparative Example 1, the interior part 1 in which sewing was not performed and the stitch pattern was not provided was obtained.

At that time, in Comparative Examples 2 and 3, since the sewing needle was overheated and smoke was generated when sewing was performed about 2 to 3 cm. In contrast, in Example 1 and Example 2, sewing was performed without any problem from beginning to end.

An area having line stitch (stitch pattern 13) of each of the obtained interior parts 1 (Examples 1 and 2, Comparative Examples 1 to 3) was cut into a test piece which is a rectangle of 150 mm×50 mm such that the line stitch passes through the center in the longitudinal direction (the line stitch is arranged along the longitudinal direction). Subsequently, the maximal bending load was measured according to JIS K7171. In this measurement, while the test piece was supported at two fulcrums (radius of curvature 5.0 mm) with a distance between the fulcrums of 100 mm, measurement was performed by applying a load to a point of application (radius of curvature 3.2 mm) located at the center between the fulcrums, at the speed of 50 mm/min. The results are illustrated in Table 1.

TABLE 1

|  |  | Sewing (Stitch Pattern) | Thickness of Periphery (mm) | Thickness of Area to be Sewn (mm) | Thick Portion (mm) | Density of Area to be Sewn (g/cm$^3$) | Maximal Bending Load (N) |
|---|---|---|---|---|---|---|---|
| Comparative Example | 1 | Absent | 2.5 | 2.5 | 0 | (0.60) | 46.0 |
|  | 2 | Present | 2.5 | 2.0 | (−0.5) | 0.75 | 36.0 |
|  | 3 | Present | 2.5 | 2.5 | (0) | (0.60) | 44.0 |
| Example | 1 | Present | 2.5 | 3.0 | 0.5 | 0.50 | 51.0 |
|  | 2 | Present | 2.5 | 3.5 | 1.0 | 0.43 | 58.5 |

From the results of Table 1, it can be seen that it is possible to provide the interior part 1 capable of having high mechanical strength while having the stitch pattern 13 penetrating the base-material layer 11. Furthermore, it can be seen that improvement in strength of the base-material layer 11 and ease of sewing can be made compatible at a high level.

That is, it can be seen that while the maximal bending load of Comparative Example 1 without the stitch pattern 13 was 46N, the maximal bending load of Comparative Example 3 in which the stitch pattern 13 was formed by sewing was lowered to 44N. Similarly, also in Comparative Example 2 in which thickness of the area 111 to be sewn is thinner than the periphery 113, the maximal bending load was significantly lowered to 36N.

However, it can be seen that the maximal bending loads of Examples 1 and 2 in which sewing was performed to form the stitch pattern 13 and the sewn area 111 of the base-material layer 11 was made thicker than the periphery 113 were 51.0 N and 58.5 N, respectively, which were greater than those before sewing.

The foregoing examples are for illustrative purposes only and are not to be construed as limiting the present invention. While the present invention has been described by way of examples of typical embodiments, it is understood that the language used in the description and illustration of the present invention is to be regarded as illustrative and not restrictive. Modifications within the scope of the appended claims can be made without departing from the scope or spirit of the present invention in its form as detailed herein. Although reference has been made herein to specific structures, materials and examples in the detailed description of the present invention, it is not intended to limit the present invention to the disclosure herein, but rather, it is to be understood that the present invention shall cover all functionally equivalent structures, methods and uses within the scope of the appended claims.

The interior part and the method for manufacturing the same (regarding automobiles, railway vehicles, and the like) of the present invention are widely used as an interior part and a method for manufacturing the same in various fields such as vehicles, aircrafts, ships, buildings and the like.

Specific examples include: automobile trim parts such as a door trim, an armrest, an upper trim, a decorative panel, an ornament panel, a lower trim, a pocket (door trim pocket), a quarter trim, and the like; a pillar garnish; a cowl side garnish (cowl side trim); seat parts such as a side airbag peripheral part; instrument panel parts such as a center cluster, a resistor, a center box (door), a glove door and an airbag peripheral part; a center console; an overhead console; a sun visor; a deck board (luggage board), an undertray; a package tray; a CRS cover; a seat side garnish; an assist grip; a passing light lever, and the like.

What is claimed is:

1. An interior part comprising:
    a base-material layer and a skin layer joined to one surface of the base-material layer,
    the base-material layer including reinforcing fibers, and a thermoplastic resin binding the reinforcing fibers together,
    wherein a thread sewn between an opposite surface of the base-material layer with respect to the one surface and a design surface of the skin layer forms a stitch pattern provided on the design surface, and
    a sewn area in the base-material layer is thicker than a periphery of the sewn area, the sewn area being an area of the base-material layer that is disposed between the thread and the one surface.

2. The interior part according to claim 1, wherein the sewn area is formed to be thick and protrude only on the opposite surface of the base-material layer.

3. The interior part according to claim 2, wherein the stitch pattern is line stitch, and the sewn area is formed to have a thick line shape along the line stitch.

4. The interior part according to claim 1, wherein the stitch pattern is line stitch, and the sewn area is formed to have a thick line shape along the line stitch.

5. The interior part according to claim 1, wherein the sewn area is thicker than the periphery of the sewn area by 5% or more.

6. The interior part according to claim 1, wherein fineness of the thread is from 500 dtex to 1300 dtex inclusive.

7. The interior part according to claim 1, wherein a flexural modulus of the base-material layer at the sewn area is higher than a flexural modulus of the base-material layer at the periphery of the sewn area.

8. The interior part according to claim 1, wherein a density of the base-material layer at the sewn area is less than a density of the base-material layer at the periphery of the sewn area.

9. The interior part according to claim 8, wherein the density of the base-material layer at the sewn area is X, the density of the base-material layer at the periphery of the sewn area is Y, and a ratio X/Y satisfies a relationship $0.50 \leq X/Y \leq 0.95$.

\* \* \* \* \*